June 3, 1969  R. E. DOERFLER  3,447,836
METERING VALVE

Filed Feb. 21, 1968

INVENTOR
ROGER E. DOERFLER
BY William J. Dick
ATTORNEY

United States Patent Office

3,447,836
Patented June 3, 1969

3,447,836
METERING VALVE
Roger E. Doerfler, Annapolis, Md., assignor to Hydrasearch Co., Inc., Annapolis, Md., a corporation of Maryland
Filed Feb. 21, 1968, Ser. No. 707,096
Int. Cl. B60t *13/12;* G05d *11/00;* F15b *7/06*
U.S. Cl. 303—6                                           10 Claims

ABSTRACT OF THE DISCLOSURE

Apparatus for metering hydraulic pressure from the master cylinder of a hydraulic brake system to the front disc brakes of a motor vehicle having a hybrid brake system. As is disclosed herein, the metering valve permits free hydraulic flow of hydraulic fluid to the front disc brakes up to a certain predetermined pressure level thus compensating for pressure and volume changes caused by temperature changes. Thereafter, upon brake application, the valve is closed off until a second pressure level is attained at which time the disc brakes are actuated. The valve includes a body having a bore connected between the inlet and outlet thereof, and a spool and coaxially mounted plunger, both being urged toward the inlet of the valve by separate springs. Interiorly of the spool is a poppet and a poppet retainer composed of a resilient material which urges the poppet towards the plunger, while the plunger spring tends to urge the plunger and thus the poppet towards the inlet allowing free flow of hydraulic fluid, or fluid communication between the master cylinder and the outlet of the valve. At a predetermined preset pressure level, the plunger moves away from its contact with the poppet permitting the poppet to close-off free hydraulic communication and at a second pressure level at the inlet, the entire spool moves away from the inlet against its spring pressure permitting hydraulic communication once again between the inlet and outlet.

SUMMARY OF THE INVENTION

The present invention relates to a metering valve for use in a hydraulic brake system and more particularly relates to an improved metering valve adapted to delay pressurization of the front wheel brakes where the front wheels are provided with disc type brakes and the rear wheels are provided with drum type brakes.

In conventional automative braking systems having disc brakes on all four wheels; upon hydraulic pressure being communicated to the disc brakes, braking force is developed almost immediately. Because of the linkage and heavy return springs inherent with shoe or drum type brakes a considerable hydraulic pressure must be applied prior to the shoe engaging the drum. Thus in hybrid brake systems having front disc and rear shoe or drum type, if the fluid pressure from the master cylinder is not metered to the front disc brakes the front brakes will be actuated prior to the rear shoe type brakes, which prematured actuation is not only dangerous but can result in increased wear in the front brake system.

A multitude of metering valves have been proposed, which valves prevent hydraulic communication between the master cylinder and the front disc brakes until a predetermined preset pressure is reached. Such a valve is shown in the Doerfler Patent #3,304,130, owned by the assignee of this application. However, it has been discovered that it is necessary that the disc brakes have a free hydraulic flow between the master cylinder and the disc brake piston, prior to actuation of the brakes, to compensate for volumeteric changes in the hydraulic fluid brought about by changes in temperature of the brake fluid. For example, as the temperature of the hydraulic fluid decreases, its volume decreases tending to pull the disc brake piston inward which in turn requires a longer master cylinder pedal travel which can be unsafe as the capacity of the system may not permit compensation for this decrease upon the initial movement of the master cylinder pedal. On the other hand, and once again without free hydraulic flow between the master cylinder and the disc brake piston, if the temperature of the hydraulic fluid is raised, as by the driver "riding" the brake pedal, the disc brake piston tends to move outwardly towards the disc causing premature braking and both wear and heating of the disc brake hydraulic system.

In view of the above it is a principal object of the present invention to provide a metering valve which permits fluid communication between the master cylinder and disc brakes when the brake pedal is not applied or is applied lightly, thus permitting and allowing for volumetric changes in the hydraulic fluid.

Another object of the present invention is to provide a novel metering valve which closes off the path of flow of hydraulic fluid between the master cylinder and front disc brakes at a predetermined, preset level, and opens up hydraulic communication between the master cylinder and the disc brakes upon a predetermined second pressure level being reached.

Yet another object of the present invention is to provide a metering valve which is relatively rugged and of simple construction.

Another object of the present invention is to provide a metering valve which may be placed in any position and is not "position sensitive" as to its operation.

Other objects and a fuller understanding of the invention may be had by referring to the following specification and claims taken in conjunction with the accompanying drawings in which:

Figure 2:
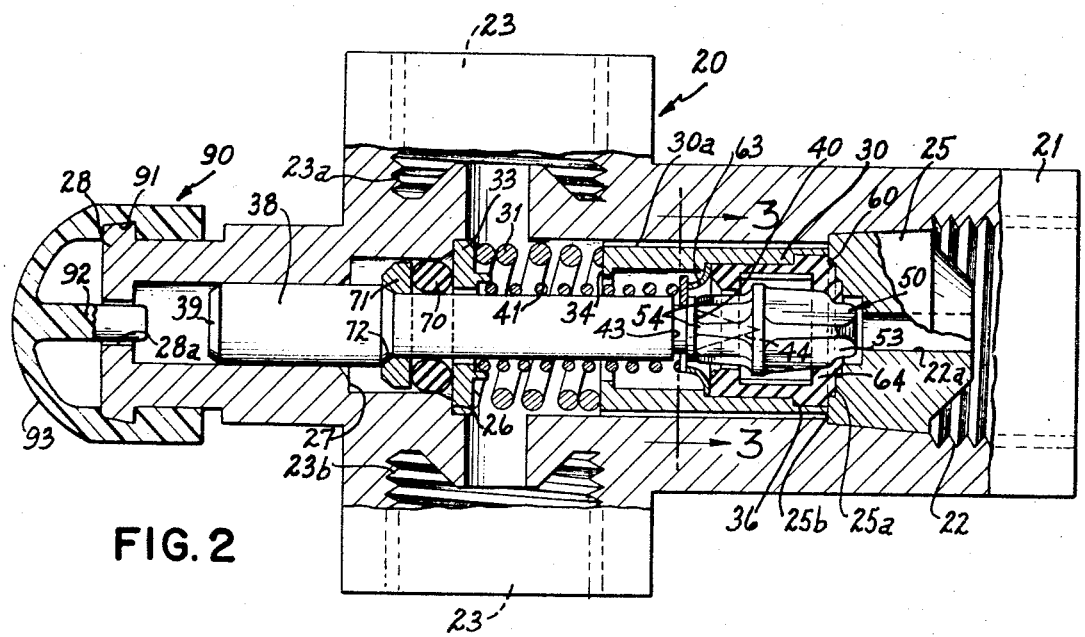
FIG. 2 is an enlarged sectional view through the metering valve of the present invention.
Figure 4:
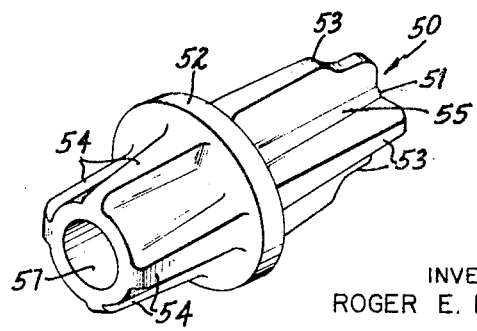
FIG. 4 is an enlarged perspective view of a portion of the apparatus illustrated in FIG. 2, and removed therefrom.
Figure 5:
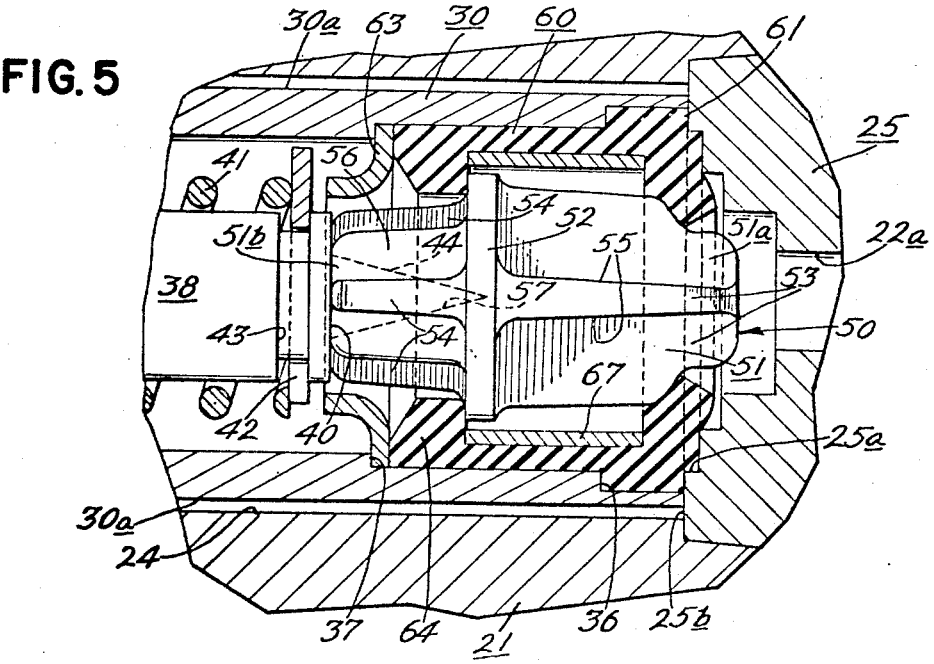
FIG. 5 is an enlarged fragmentary sectional view in side elevation showing a portion of the apparatus in a position as fluid communication between the inlet and the outlet is closed off.
Figure 6:
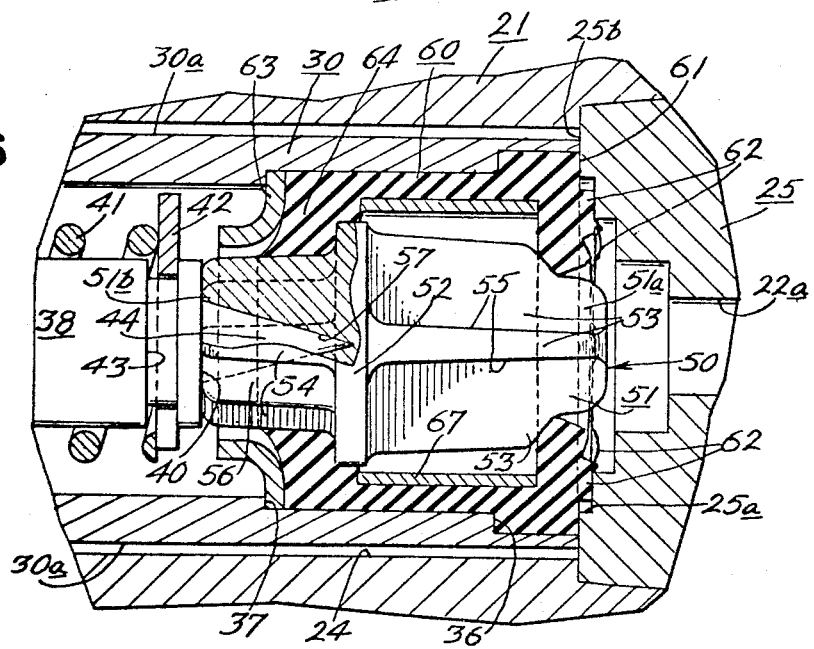
Figures 5A, 5B:
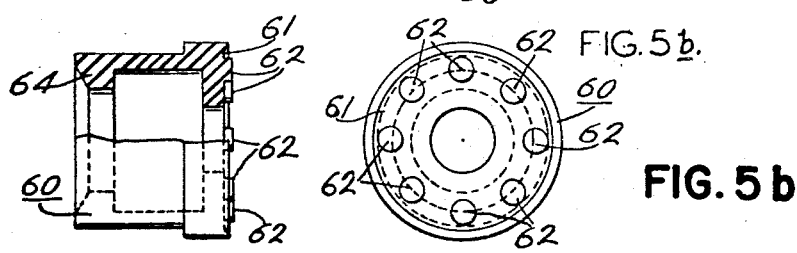
Figure 7:
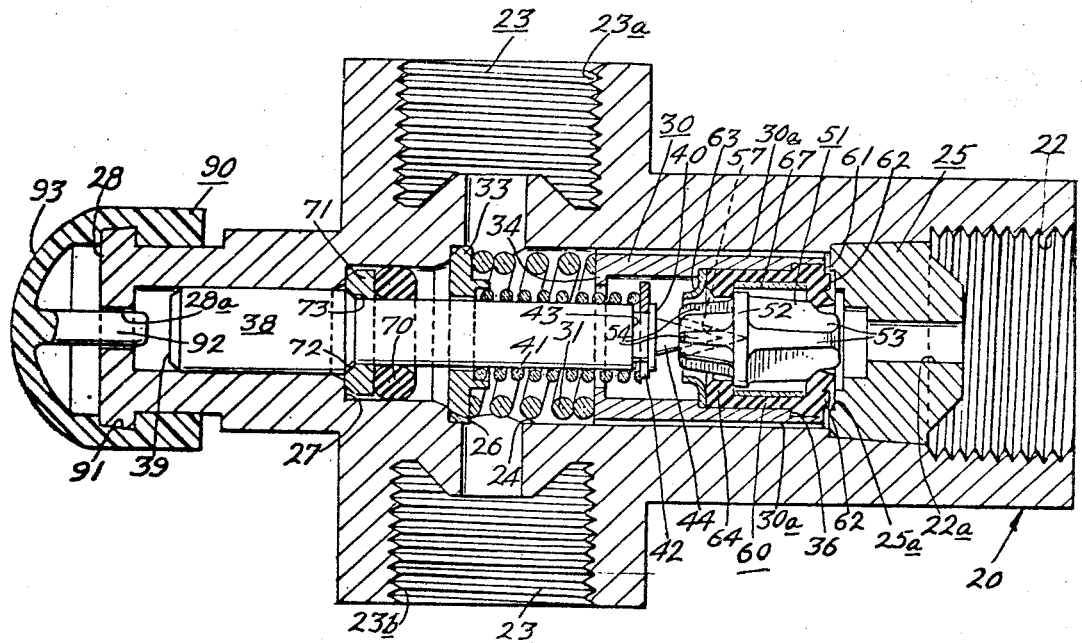
Figure 8:
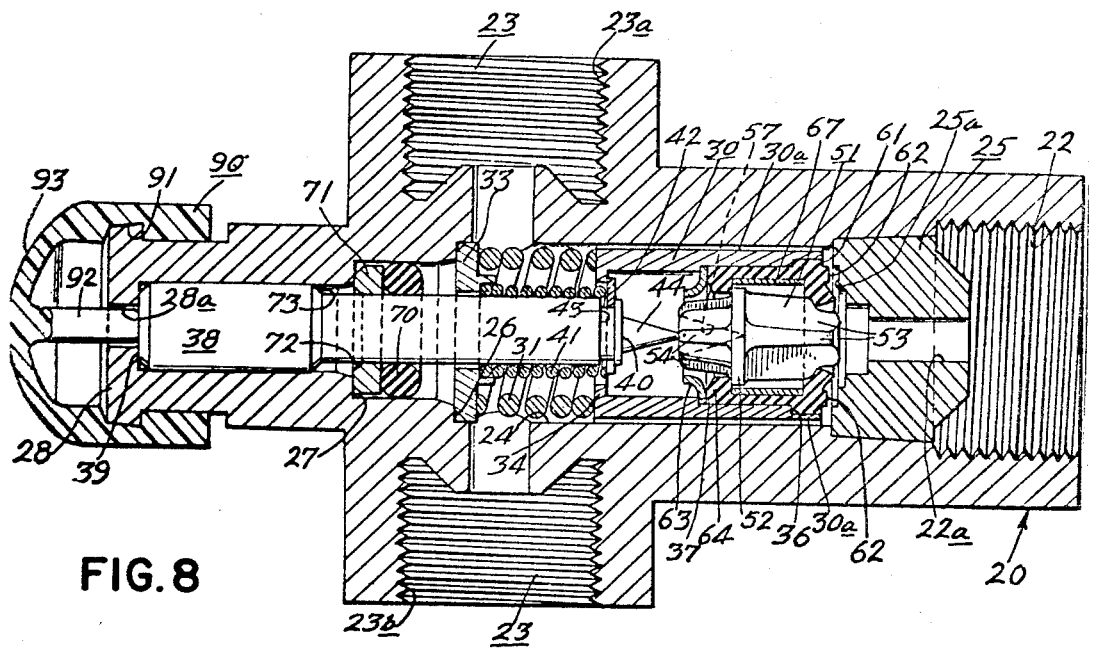
Figure 9:
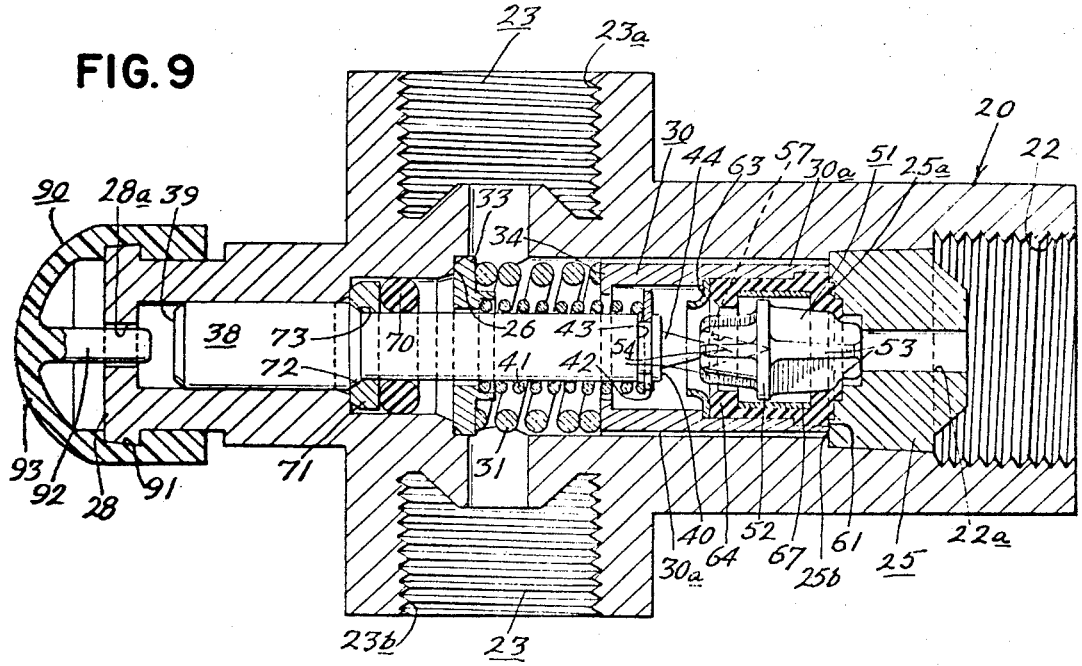
Figure 10:
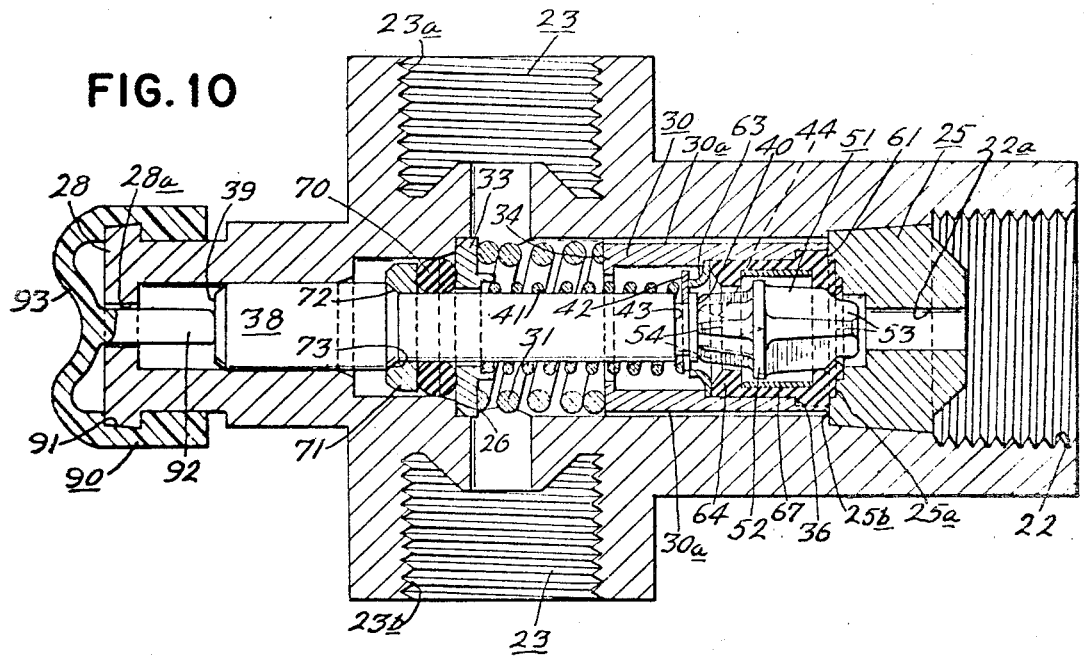

FIG. 5*a* is a side elevational view of a portion of the metering valve shown in FIGS. 2 and 5 and specifically adapted to cooperate with the portion of the valve illustrated in FIG. 4;

FIG. 5*b* is an end elevational view of the apparatus shown in FIG. 5;

FIG. 6 is a fragmentary sectional view similar to FIG. 5 and illustrating the apparatus of the present invention in still another position;

FIG. 7 is a fragmentary sectional view in side elevation showing a portion of the valve in still another position as the valve starts to "crack" and permit pressure increase at the inlet to be reflected at the outlet;

FIG. 8 is a view similar to that of FIG. 7 but in which the pressure at the inlet is fully reflected at the outlet;

FIG. 9 is a side elevational sectional view similar to that shown in FIGS. 7 and 8 but illustrating the valve in a position as pressure at the inlet is reduced; and FIG. 10 is a side elevational view in section similar to that shown in FIGS. 7–9 but illustrating the manner in which the front brake lines may be bled.

Figure 1:
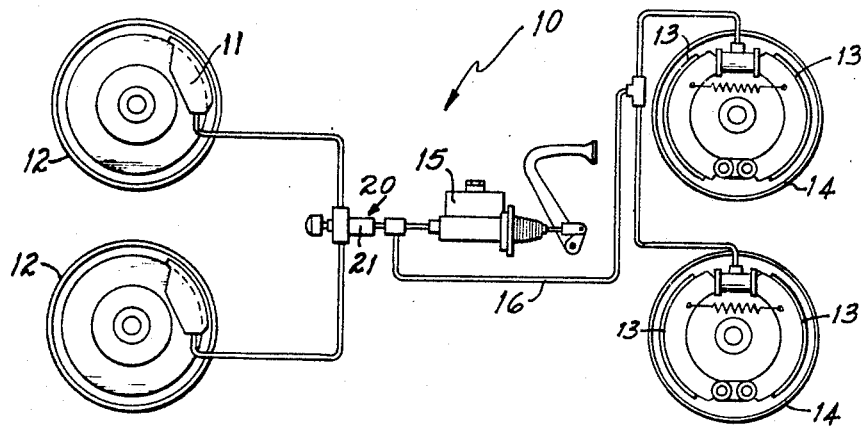
FIG. 1 is a diagrammatic view of a hybrid hydraulic brake system embodying the metering valve of the present invention.

Referring now to the drawings, and especially FIG. 1, a hybrid brake system 10 is schematically illustrated therein comprising, in the present instance, caliper type disc brakes 11 mounted on front wheels 12 and shoe type brakes 13 mounted on rear wheels 14. As is conventional, a foot actuated hydraulic pressure source or master cylinder 15 is connected via hydraulic piping 16 to the hydraulic pistons associated with the shoe type brakes 13. Although not shown in the drawing, intermediate the master cylinder and the shoe type brakes 13 may be positioned a residual pressure valve and/or a proportioning valve such as shown in the Doerfler Patent #3,304,130. Connected to the outlet of the hydraulic master cylinder 15 is a novel metering valve 20 constructed in accordance with the present invention, and which by hydraulic piping 17 is connected to the caliper type disc brakes 11 mounted on the front wheels 12.

In accordance with the invention the novel metering valve 20 of the present invention permits free passage of hydraulic fluid between the master cylinder 15 and the caliper type disc brakes 11 until a first level of hydraulic pressure is communicated to the disc brakes by the master cylinder 15, and thereafter the valve is caused to shutoff until a second level of pressure is reached at which time the hydraulic pressure is applied by the master cylinder to the disc brakes. To this end, the metering valve 20 comprises a valve body 21 having an inlet 22 for connection to the hydraulic pressure source or master cylinder 15, and at least one outlet 23, in the present instance a pair of outlets 23a and 23b for connection via hydraulic piping 17 to the disc brakes 11. As illustrated in FIG. 2, the inlet and outlet are connected by bore means 24, the bore means 24 being connected to the inlet 22 for fluid communication therewith as by an inlet extension 22a in a plug 25 secured in the inlet of the body 21. As shown, the bore 24 is radially and axially stepped to form annular shoulders 26 and 27, the purposes for which will be explained more fully hereinafter, the bore 24 extending axially through the body and communicating at the end 28 thereof through an aperture 28a with the atmosphere.

As shown in the drawings, interiorly of the bore 24 is slidable spool means 30 including primary spool biasing means, in the present instance a spring 31 which urges the tubular spool 30 towards the inlet 22 engaging the plug 25. As shown in FIG. 2, one end of the spring 31 is positioned against a collar 33 which abuts the shoulder 26 in the body 21, the opposite end of the spring engaging a radially and inwardly extending, annulus or stop 34 of the spool 30 thereby biasing the spool against the wall 25b of the plug 25. It is noted at this time that the spool 31 is recessed as at 36 and 37 to form shoulders and includes fluid bypass means, in the present instance axially extending, arcuately spaced grooves 30a, in the periphery of the spool, the purpose of which will be more fully described hereinafter.

Figure 3:
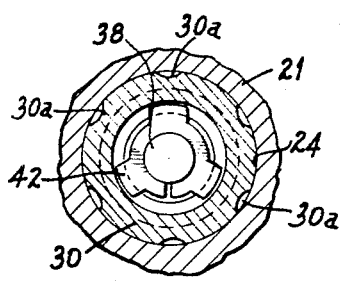
FIG. 3 is a fragmentary sectional view taken along line 3—3 of FIG. 2.

Mounted interiorly of the bore 24 and, in the present instance substantially coaxial therewith, is plunger means 38, one end 39 of which is exposed to atmospheric pressure via the aperture 28a, the other end 40 of which extends into the tubular spool 30, the plunger being normally urged towards the inlet by secondary biasing means, in the present instance a spring 41 closely wound on the plunger, one end of which abuts the collar 33 and the other end of which engages a radial projection comprising a peripherally slotted, in the present instance trifurcated snap ring 42 (see FIG. 3) mounted in a recess 43 adjacent the end 40 of the plunger 38.

In order to permit free fluid communication between the inlet 22 and the outlet 23 when no pressure is applied to the inlet by the master cylinder 15, and in order to close off the path of fluid communication at a first pressure level upon actuation of the master cylinder 15, while permitting fluid communication at a predetermined higher pressure level at the inlet, novel poppet means 50 are provided. To this end, the poppet means 50 comprises a cylindrical shuttle valve 51 including a radially extending disc-shaped closure element 52 thereon. As best shown in FIG. 4, the closure element 52 divides the valve into an inlet portion 51a and an outlet portion 51b, each being provided with axially extending, arcuately spaced flutes 53 and 54 forming axially extending intermediate passageways 55 and 56. As shown, the shuttle valve 51 also includes a cone-shaped depression 57 which cooperated with a like projection 44 on the end 40 of the plunger in order to maintain proper alignment of the poppet valve.

As best shown in the drawings, the shuttle valve 51 is housed interiorly of a tubular poppet retained 60 which is mounted inside the spool 30 and retained therein by the shoulders 36 and 37 thereof and a ring 67. As noted in FIGS. 2, 5a and 5b an inwardly and radially projecting annular wall 61 of the poppet retainer 60 having a plurality of circumferentially spaced, axially projecting lugs 62 which engage the recess 25a associated with the end of the plug thereby effecting a seal. At the opposite end of the retainer 60 is an annular stop 63 which is engageable with the shoulder 37, the stop having circumferentially spaced radial recesses 64a which permit fluid communication between the interior of the tubular poppet retainer and the outlet 23 of the valve (see FIG. 3). Referring now to FIGS. 5a and 5b, the poppet retainer 60 is preferably composed of a resilient material such as a rubber which is impervious to hydraulic brake fluid, and which, by means of the inwardly projecting annular wall 61, operates to bias the shuttle valve 51 normally urging it away from the inlet passageway 22a.

At the opposite end of the retainer 60, adjacent the stop 63, is an inwardly projecting annular seal 64 which projects towards the axis of the shuttle valve a sufficient distance to permit engagement thereby when the shuttle valve moves away from the inlet. Movement of the shuttle valve is effected by movement of the plunger 38 away from the inlet (to the left in FIG. 2), thus permitting engagement of disc-shaped closure element 52 of the poppet valve 51 with the annular seal 64. As shown in FIG. 2, the initial position of the shuttle valve 51 with respect to the poppet retainer 60 is with the flutes 53 pushing against the annulus 61, this being caused by the engagement of the plunger 38 against the shuttle valve, the snap ring 42 engaging the stop 63 and thereby limiting the movement of the plunger towards the inlet. In this position the disc-shaped closure element 52 is axially spaced from the annular seal 64 and, fluid communication between the inlet 22 and outlet 23 is permitted as fluid communication is through the passageways 55 intermediate the flutes 53, over the disc-shaped closure element 52, through the passageways 56 intermediate flutes 54, and the stop 63 and snap ring 42 and through the outlets 23.

In order to inhibit fluid communication with the atmosphere through the aperture 28a, an O-ring seal 70 is positioned circumscribing the plunger 38 for engagement therewith and engagement with the interior wall of the bore 24. As may be seen in FIG. 2, a seal back-up washer 71 is slidably mounted on the plunger and includes a conical seat 72 engageable with a like chamfered portion 73 on the plunger.

Operation of the metering valve of the present invention is best seen in FIGS. 5–9. As has already been explained above, the quiescent position of the valve and its various parts is shown in FIG. 2 wherein a free flow fluid path is defined between the inlet and the outlet.

As fluid pressure is increased at the inlet by the hydraulic master cylinder 15, the cross sectional area of the plunger 38 is exposed to an increased pressure differential because the end 39 of the plunger is open to the atmosphere, while the end 40 is exposed to the increase in hydraulic inlet pressure. This causes the plunger to start its leftward movement away from the inlet 22 and disengagement of the projection 44 on the end 40 of the plunger from the conical aperture 57 in the shuttle valve 51. As shown in FIG. 5, the biasing action of the inwardly projecting annular wall 61 causes movement of the shuttle valve 51 away from the inlet until the disc-shaped closure element 52 contacts the annular seal 64. The inlet pressure at which the disc 52 contacts the seal 64 is a direct function of the compression in the plunger spring 41 and the axially exerting force caused by the annular wall 61, which opposes movement of the plunger towards the inlet. The "arresting" pressure (the point at which free fluid communication between the inlet and outlet is arrested) may therefore be set as desired, typical design pressures at which the disc 52 engages the seal 64 being anywhere from 4 to 30 p.s.i.

As pressure is increased, some fluid flow will occur past the disc-shaped closure element 52 and by the seal 64 until the hydraulic pressure exerted on the inlet side of the disc 52 causes the disc to fully engage the seal 64. Isolation of the inlet from the outlet in this manner, i.e. by the soft resiliency of the seal 64, prevents a condition from occurring in the valve akin to "water hammer." Simultaneously, as the shuttle valve 51 more fully engages the seal 64, the end wall 61 starts straightening itself out and hydraulic fluid is permitted into the recess 25a of the plug 25 creating additional force on the end wall 61 and therefore additional pressure on the shuttle valve 51 against the seal 64. At this point the inlet may be considered isolated from the outlet.

At a second level of pressure at the inlet, preferably a level corresponding to the pressure at which the rear brakes will start to engage, communication between the inlet and outlet will be restored. Typically, it is desirable to have the valve crack open at a pressure of between 110 to 140 p.s.i. To this end, and as best shown in FIG. 7, as pressure builds up on the wall 61 of the poppet retainer 60, intermediate the wall 61 and the recess 25a in the plug 25, the resistance to movement of the spool 30 by its biasing means or spring 31 will be overcome, and the spool will tend to move towards the outlet away from the inlet. As the spool 30 has peripheral and axially extending sots 30a, fluid communication between the inlet 22 and the outlets 23 occurs. Upon pressure communication with the outlet, the pressure at the outlet side of the spool approximates the pressure at the inlet causing the spool 30 to move back towards the inlet due to the pressure of the spring 31. However, the increase in pressure caused by the momentary cracking of the spool 30 increases the pressure differential on the plunger 38 causing the plunger to move rearwardly away from the inlet until the snap ring 42 engages the interior part of the end wall or stop 34 of the spool 30. At this point the differential pressure exerted on the plunger 38 by the outlet pressure relative to the atmospheric pressure at the end 39 of the plunger 38, moves the spool 30 away from the inlet and holds the spool away from the inlet in the position shown in FIG. 8 until inlet pressure is reduced.

Upon reduction of inlet pressure the spool 30 will move back into engagement with the plug 25, the differential pressure across the shuttle valve, i.e. between inlet and outlet, causing the shuttle valve to move towards the inlet engaging the wall 61 and sealing the spool from the inlet extension passageway 22a. However, in this manner fluid communication is restored between the inlet and outlet and the pressure in the system drops to its residual state because the plunger 38, upon sensing the drop in pressure is caused to move by its spring 41 towards the inlet and into engagement with the shuttle valve 51 to keep the shutle valve in its open position.

When it is desired to bleed the front brakes, it is necessary that the shuttle valve 51 be held open and not actuated upon a pressure increase in the inlet caused by actuation of the master cylinder 15. To this end, a dust cover or cup 90 having an interior circumferential groove 91 therein is positioned to overlie the radially projecting wall 28 of the valve body 21. As shown in FIGS. 2, and 7–10, a pin 92 mounted in the cup 90 is positioned so as to pass through the aperture 28a in the end wall 28 of the valve body. When it is desired to bleed the front disc brakes, the arcuate portion 93 of the cup 90 may be buckled inward, similar to an oil can action, causing the pin 92 to engage the end 39 of the plunger 38 thus maintaining the snap ring 42 against the stop 63 and preventing movement of the shuttle valve 51 away from the inlet 22. In this manner, free flow of hydraulic fluid is assured between the inlet 22 and the outlets 23.

Thus the valve of the present invention permits fluid communication between the master cylinder and disc brakes when the brake pedal is not applied or is applied lightly, thereby permitting and allowing for volumetric changes in the fluid in the hydraulic brake lines. In addition, because the various portions of the valve are positive-acting, the valve is not position sensitive in its operation and yet is of simple design while being relatively rugged.

What is claimed is:

1. A metering valve for an automotive vehicular hydraulic brake system comprising a valve body having an inlet adapted to be connected to a hydraulic pressure source and an outlet adapted to be connected to at least one brake on said vehicle; bore means connecting said inlet and said outlet; tubular spool means slidably mounted in said bore having a fluid passageway therethrough and primary biasing means urging said spool means toward said inlet, slidably mounted plunger means in said bore, and secondary biasing means connected to said plunger to urge said plunger towards said inlet; poppet means cooperating with said plunger and urged thereby towards said inlet and in an open condition whereby fluid communication is effected between said inlet and said outlet through said tubular spool until a predetermined pressure is reached at said inlet, poppet biasing means normally urging said poppet away from said inlet and towards said plunger; said plunger movable away from said poppet as fluid pressure is increased at said inlet until said predetermined pressure is reached and said poppet closes fluid communication between said inlet and said outlet via said fluid passageway; fluid bypass means operable to connect said inlet to said outlet when said spool moves away from said inlet, said spool, operative at a second pressure level over said first pressure level to move against its biasing means allowing communication between said inlet and said outlet via said fluid bypass means.

2. A metering valve in accordance with claim 1 wherein said plunger means extends into said tubular spool means; a first stop means in said spool for engaging said plunger to limit movement of said plunger towards said inlet, and second stop means carried by said spool, axially spaced from said first mentioned stop means for engagement with said spool whereby as said plunger moves away from said inlet, at a pressure at the inlet greater than said second level of pressure, said spool will be carried by said plunger away from said inlet.

3. A metering valve in accordance with claim 1 wherein said poppet means includes a shuttle valve having a disc-shaped closure element thereon, and means providing a fluid passageway; said poppet biasing means including an axially extending, tubular and resilient poppet retainer, housing said shuttle valve; said poppet retainer being mounted interiorly of said spool and having an inwardly projecting annular seal engageable with said disc-shaped closure element when said plunger is moved away from said shuttle valve.

4. A metering valve in accordance with claim 1 including fixed seal means intermediate said poppet means and said plunger, and means carried by said poppet means for engagement with said seal as said plunger moves away from said inlet.

5. A metering valve in accordance with claim 1 wherein said bore extends axially through said body, and said plunger is exposed to atmospheric pressure at one end thereof and to inlet pressure at the other end thereof when it is in a position cooperating with said poppet means.

6. A metering valve in accordance with claim 1 wherein said poppet means includes a cylindrical shuttle valve having a radially projecting closure element thereon dividing said shuttle valve into an inlet and outlet portion, axially extending flutes in at least said inlet portion permitting fluid communication between said inlet and said closure element, and means in said spool means engageable with said closure element to seal the fluid passageway between the inlet and outlet portion of said shuttle valve upon disengagement of said plunger from said shuttle valve.

7. A metering valve in accordance with claim 6 including a tubular, poppet retainer housing said shuttle valve and mounted interiorly of said spool means, said poppet biasing means including a first, inwardly and radially projecting resilient wall engageable with said flutes and bearing axially against a portion of the body of said valve, a second inwardly and radially projecting resilient wall forming an annular seal axially spaced from said first wall and at a sufficient axial distance from said first wall permit fluid communication between said inlet portion of said shuttle valve and the outlet of said body when said plunger is cooperating with said shuttle valve and maintaining the same towards said inlet; and to seal said inlet from said outlet, upon release of said shuttle valve by said plunger, by said closure element engaging said seal.

8. A metering valve in accordance with claim 1 including a wall in said valve body, adjacent said inlet against which said spool engages in sealing relation, said fluid bypass means comprising a plurality of axially extending grooves in said spool to permit fluid communication between said inlet and said outlet at said second pressure level.

9. A metering valve in accordance with claim 6, including an axially projection on one of said shuttle valve and said plunger, and a like depression in the other for cooperation therewith.

10. A metering valve for a hydraulic system having a hydraulic pressure source and a device to be energized by said pressure source, said metering valve operative to permit hydraulic flow and pressure communication between said pressure source and said device until a first predetermined pressure is attained, and to close off fluid communication until a second pressure level is attained and thereafter to permit free fluid communication between said pressure source and said device upon increases in hydraulic pressure by said pressure source; said metering valve comprising a valve body having a hydraulic fluid inlet and outlet connected by bore means; axially extending spool means slidably mounted in said bore and having a fluid passageway therethrough, and primary biasing means urging said spool means towards said inlet and into engagement with a wall adjacent said inlet; and fluid bypass means coextensive with said spool to provide fluid communication between said inlet and outlet when said spool is disengaged from said wall; an axially extending, slidably mounted plunger in said bore and extending into said tubular spool; one end of said plunger being exposed to atmospheric pressure, and the end of said plunger positioned interiorly of said spool being exposed to inlet pressure prior to the inlet pressure being raised to said first level of pressure; secondary biasing means connected to said plunger to urge said plunger towards said inlet and into engagement with stop means connected interiorly of said spool; poppet means mounted for sliding movement interiorly of said spool and engageable with said plunger and urged thereby towards said inlet, said poppet including a cylindrical shuttle valve having a disc-shaped closure element thereon, an inwardly projecting, resilient annular seal intermediate said disc-shaped closure element and axially spaced therefrom prior to a first level of pressure being reached; and shuttle biasing means adjacent said inlet urging said poppet away from said inlet and towards said plunger whereby: upon fluid pressure at said inlet reaching said first level, the differential pressure across said plunger relative to the atmosphere causes retraction of said plunger from said inlet permitting said shuttle valve to move away from said inlet and effect a closure between said closure element and said seal thereby closing off fluid communication between said inlet and said outlet; and upon raising the inlet pressure to said second pressure level said spool disengages from said wall and permits hydraulic fluid communication between said inlet and said outlet via said bypass means.

References Cited
UNITED STATES PATENTS

| | | | |
|---|---|---|---|
| 919,155 | 4/1909 | Giffen | 137—533.25 |
| 3,278,241 | 10/1966 | Stelzer | 303—6 |
| 3,375,852 | 4/1968 | Milster | 303—6 XR |

MILTON BUCHLER, *Primary Examiner.*

J. J. McLAUGHLIN, JR., *Assistant Examiner.*

U.S. Cl. X.R.

60—54.5; 137—110; 188—152